(12) United States Patent
Mayo et al.

(10) Patent No.: US 6,174,355 B1
(45) Date of Patent: Jan. 16, 2001

(54) INK COMPOSITIONS

(75) Inventors: James D. Mayo, Mississauga; Daniel A. Foucher, Toronto; Marcel P. Breton, Mississauga, all of (CA); Fereshteh Lesani, Santa Clara, CA (US)

(73) Assignee: Xerox Corporation, Stamford, CT (US)

( * ) Notice: Under 35 U.S.C. 154(b), the term of this patent shall be extended for 0 days.

(21) Appl. No.: 09/363,480

(22) Filed: Jul. 29, 1999

(51) Int. Cl.$^7$ ..................................... C09D 11/02
(52) U.S. Cl. ..................................... 106/31.43; 106/31.27; 106/31.58; 106/31.6; 106/31.75; 106/31.86
(58) Field of Search ................................. 106/31.27, 31.43, 106/31.58, 31.6, 31.75, 31.86; 523/161

(56) References Cited

U.S. PATENT DOCUMENTS

| | | | |
|---|---|---|---|
| 4,490,731 | 12/1984 | Vaught | 346/140 R |
| 4,840,674 | 6/1989 | Schwarz | 106/31.58 |
| 4,853,036 | 8/1989 | Koike et al. | 106/31.58 |
| 5,006,170 | 4/1991 | Schwarz et al. | 106/31.29 |
| 5,111,220 | 5/1992 | Hadimioglu et al. | 346/140 R |
| 5,121,141 | 6/1992 | Hadimioglu et al. | 346/140 R |
| 5,122,187 | 6/1992 | Schwarz et al. | 106/31.29 |
| 5,124,718 | 6/1992 | Koike et al. | 346/1.1 |
| 5,128,726 | 7/1992 | Cassano et al. | 355/308 |
| 5,286,390 * | 2/1994 | Gray et al. | 210/727 |
| 5,330,656 * | 7/1994 | Hassick | 210/708 |
| 5,371,531 | 12/1994 | Rezanka et al. | 347/43 |
| 5,528,384 | 6/1996 | Metcalfe et al. | 358/447 |
| 5,667,568 | 9/1997 | Sacripante et al. | 106/31.43 |
| 5,688,312 | 11/1997 | Sacripante et al. | 106/31.49 |
| 5,700,316 | 12/1997 | Pontes et al. | 106/31.58 |
| 5,747,554 | 5/1998 | Sacripante et al. | 523/161 |
| 5,844,020 | 12/1998 | Paine et al. | 523/161 |
| 5,897,695 | 4/1999 | Mayo et al. | 106/31.75 |
| 6,110,636 * | 8/2000 | Foucher et al. | 430/137 |

* cited by examiner

Primary Examiner—Helene Klemanski
(74) Attorney, Agent, or Firm—E. O. Palazzo

(57) ABSTRACT

An ink composition comprised of a colorant and poly(diallyl diethyl ammonium) bromide.

24 Claims, No Drawings

INK COMPOSITIONS

PENDING APPLICATIONS AND PATENTS

Inks are illustrated in U.S. Pat. No. 5,688,312, U.S. Pat. No. 5,667,568, U.S. Pat. No. 5,700,316, U.S. Pat. No. 5,747,554, U.S. Pat. No. 5,844,020 and U.S. Pat. No. 5,897,695, and in copending patent applications U.S. Ser. No. 08/641,866 now U.S. Pat. No. 5,932,630, U.S. Ser. No. 08/935,929 now U.S. Pat. No. 5,931,995, U.S. Ser. No. 08/935,889 now U.S. Pat. No. 5,902,390, U.S. Ser. No. 08/935,639 now U.S. Pat. No. 5,922,117, U.S. Ser. No. 08/933,914 now U.S. Pat. No. 5,958,119, U.S. Ser. No. 09/300,210 now U.S. Pat. No. 6,086,661, U.S. Ser. No. 09/300,193 now U.S. Pat. No. 6,096,124, U.S. Ser. No. 09/300,373 now U.S. Pat. No. 6,066,200, U.S. Ser. No. 09/300,298 now U.S. Pat. No. 6,106,601, U.S. Ser. No. 09/300,331 now U.S. Pat. No. 6,110,265, U.S. Ser. No. 09/300,333 now U.S. Pat. No. 6,071,333, U.S. Ser. No. 09/300,332 now U.S. Pat. No. 6,096,125, and U.S. Ser. No. 09/362,673, the disclosures of each of these applications are totally incorporated herein by reference.

The appropriate components and processes of the above pending applications and patents may be selected for the present invention in embodiments thereof.

BACKGROUND OF THE INVENTION

The present invention is directed to ink compositions, and more specifically, the present invention relates to aqueous inks especially useful for ink jet processes, reference U.S. Pat. No. 5,897,695, the disclosure of which is totally incorporated herein by reference, thermal ink jet, acoustic ink printing, processes and apparatuses thereof, reference for example, the above recited copending patent applications, and U.S. Pat. No. 5,121,141, U.S. Pat. No. 5,111,220, U.S. Pat. No. 5,128,726, U.S. Pat. No. 5,371,531, U.S. Pat. No. 5,528,384 and U.S. Ser. No. 08/176,381, now abandoned the disclosures of which are totally incorporated herein by reference, including especially acoustic ink processes as illustrated in some of the aforementioned copending applications and patents, such as an acoustic ink printer for printing images on a record medium.

More specifically, the present invention is directed to ink compositions, especially aqueous inks wherein there can be generated with such inks excellent developed images with acceptable image permanence, excellent projection efficiency on transparencies, superior waterfastness characteristics, for example waterfastness values of about 95 to about 100 percent, and excellent crease resistance, and wherein the inks need not contain salts and moreover wherein the inks reduce or minimize corrosion of for example ink jet heads. Moreover, in embodiments of the present invention, there are provided inks that enable the elimination, or minimization of undesirable paper curl. The inks of the present invention in embodiments thereof are comprised of a vehicle, and optionally a noncolored vehicle, reference U.S. Pat. No. 5,688,312, U.S. Pat. No. 5,667,568, U.S. Pat. No. 5,700,316, and U.S. Pat. No. 5,747,554, the disclosures of each being incorporated herein by reference.

PRIOR ART

In acoustic ink printing, the printhead generates about 2.2 picoliter droplets by an acoustic energy process. The ink under these conditions should display a melt viscosity of about 25 centipoise or less at the jetting temperature. Furthermore, once the ink is jetted onto the paper, the ink image should be of excellent crease property, nonsmearing, waterfast, of excellent transparency and excellent fix qualities. In selecting an ink for such applications, it is desirable that the vehicle display a low melt viscosity, such as from about 1 centipoise to about 20, and preferably about 10 centipoise in the acoustic head.

Ink jet printing processes that utilize inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is selected to have a melting point above room temperature so that the ink which is melted in the apparatus will not be subject to evaporation or spillage during periods of nonprinting. The vehicle is also selected to have a low temperature to permit the use of the solid ink in a thermal ink jet printer. In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, disclose hot melt ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, and the like.

U.S. Pat. No. 4,853,036 and U.S. Pat. No. 5,124,718 disclose, for example, an ink for ink jet recording which comprises a liquid composition essentially comprising a coloring matter, a volatile solvent having a vapor pressure of 1 millimeter Hg or more at 25° C., and a solid material at room temperature.

While known compositions and processes are suitable for their intended purposes, a need remains for ink compositions suitable for ink jet printing. In addition, there is a need for ink compositions which are compatible with a wide variety of plain papers. Further, there is a need for aqueous ink compositions which generate high quality, waterfast images on plain papers. There is also a need for ink jet ink compositions, which generate high quality, fast-drying images on a wide variety of plain papers at low cost, with high quality text and high quality graphics. Further, there is a need for ink jet ink compositions which exhibit minimal feathering. Additionally, there is a need for ink jet ink compositions which exhibit minimal intercolor bleed. There is also a need for hot melt ink jet ink compositions which exhibit excellent image permanence. Further, there is a need for ink jet ink compositions which are especially suitable for use in aqueous acoustic ink jet printing processes. There is also a need for ink compositions suitable for ink jet printing wherein high optical densities can be achieved with relatively low dye concentrations. A need also remains for ink compositions suitable for ink jet printing wherein curling of the substrate subsequent to printing is minimized, or avoided.

SUMMARY OF THE INVENTION

Examples of features of the present invention include for example:

It is a feature of the present invention to provide ink compositions with many of the advantages illustrated herein.

It is another feature of the present invention to provide aqueous ink compositions suitable for acoustic ink jet printing.

It is yet another feature of the present invention to provide ink compositions which are compatible with a wide variety of plain papers.

It is still another feature of the present invention to provide ink compositions which generate high quality images on plain papers.

Still another feature of the present invention is to provide ink jet ink compositions which exhibit minimal intercolor bleed.

It is another feature of the present invention to provide ink jet ink compositions which exhibit excellent image permanence.

Another feature of the present invention is to provide ink compositions suitable for ink jet printing wherein high optical densities can be achieved with relatively low dye concentrations.

Aspects of the present invention relate to an ink composition comprised of a colorant and poly(diallyl diethyl ammonium) bromide; an aqueous ink and wherein the ink contains water; an ink wherein the water is present in an amount of about 60 to about 99.5 weight percent; an ink wherein the water is present in an amount of about 80 to about 99 weight percent; an ink wherein the $M_w$ of the poly(diallyl diethyl ammonium) bromide is from about 500 to about 3,000, or from about 1,000 to about 2,000; an ink wherein the poly(diallyl diethyl ammonium) bromide is present in an amount of from about 0.5 to about 10 weight percent, and wherein the total of all ink components is about 100 weight percent; an ink wherein the poly(diallyl diethyl ammonium) bromide is present in an amount of from about 1 to about 4 weight percent, and wherein the total of all ink components is about 100 weight percent; an ink wherein the colorant is a dye; an ink wherein the colorant is black; an ink wherein the colorant is magenta, yellow, cyan, red, blue, green, black, or mixtures thereof; an ink composition wherein the colorant is a dye present in the ink in an amount of from about 0.01 to about 10 percent by weight; an ink composition wherein the colorant is a dye present in an amount of from about 1 to about 10 weight percent, and wherein the colorant is cyan, magenta, yellow, blue, green, brown, black, or mixtures thereof; an ink containing a solvent; an ink wherein the solvent is sulfolane, 2,2'-thiodiethanol, or butyl carbitol present in an amount of from about 1 to about 40 percent by weight; an ink wherein the solvent is present in an amount of from about 10 to about 20 parts or weight percent of the total ink component; an ink containing a biocide; an ink wherein the biocide is present in an amount of about 0.01 to about 0.25 percent by weight; a printing process which comprises incorporating into an ink jet printer an ink composition comprised of a colorant and polydiallyl diethyl ammonium bromide, and causing droplets of the ink to be ejected in imagewise pattern onto a substrate; a process which comprises (a) providing an acoustic ink printer having a pool of the liquid ink illustrated herein with a free surface, and a printhead including at least one droplet ejector for radiating the free surface of the ink with focused acoustic radiation to eject individual droplets of ink therefrom on demand, the radiation being directed to focus with a finite waist diameter in a focal plane, the ink comprising a colorant and poly(diallyl diethyl ammonium) bromide and (b) causing droplets of the ink to be ejected onto a recording sheet in an imagewise pattern at an optional temperature of from about 25° C. to about 50° C.; a thermal ink jet process; poly(diallyl diethyl ammonium) bromide; an imaging process wherein there are developed images with an aqueous ink comprised of a colorant and a vehicle; an imaging process wherein there are developed images with an aqueous ink comprised of a colorant, a vehicle and poly(diallyl diethyl ammonium) bromide; an imaging process wherein the vehicle is water; an ink composition comprised of water, colorant and an additive of quaternary amine polymer of poly(diallyl diethyl ammonium) bromide, and wherein this additive preferably possess a $M_w$ (weight average molecular weight) of from about 500 to about 5,000, and a $M_n$ (number average) of from about 500 to about 3,000, with the preferred $M_w$ and $M_n$ being 2,000 and 1,000, respectively, and wherein with such an additive there is enabled inks with excellent waterfastness, inks with less corrosive characteristics, the capability of being able to select a large number of ink additives, and dyes as compared to the corresponding, commercially available poly(diallyl diethyl ammonium) chloride.

Of importance with respect to the present invention is the additive of poly(diallyl diethyl ammonium) bromide. This additive is present in the ink in an amount of, for example, from about 0.5 to about 10 weight percent, and preferably from about 1 to about 4 weight percent and wherein the total of all ink components is about 100 weight percent, or about 100 parts. Characteristics of the poly(diallyl diethyl ammonium) bromide are for example that it is a finely divided powder, with an NMR spectrum possessing sharp peaks at 1.2, 2.5, 3.1, 3.35, and 3.8; and its lack of colored impurities, and its high solubility in water, are not believed to be possessed by the corresponding poly(diallyl diethyl ammonium)chloride.

A particular advantage of the poly(diallyl diethyl ammonium)bromide ink formulation can be achieved when preparing black inks. For example, table black inks were prepared using poly(diallyl diethyl ammonium)bromide; and after two weeks at 75° C., no precipitate was observed. An identical ink formulation, except that it was prepared with poly(dimethyl diallyl ammonium)chloride in place of the chloride, was found to precipitate immediately upon addition of a black dye.

The poly(diallyl diethyl ammonium) bromide, which is believed to be a novel compound, can be prepared as follows: 400 grams (1.58 moles) of the DDAB (diallyl diethyl ammonium bromide) monomer was dissolved in 200 grams of distilled deionized water. The resulting solution, together with 72 grams (18 weight percent of monomer) of the initiator t-butylhydroperoxide, was charged into a one liter Buchi equipped with external oil heating unit. The reaction vessel was sealed, the Buchi temperature set at 100° C. for 6 hours, and the reaction mixture was stirred at moderate rpm, and went under approximately 2 psi of pressure. At the completion of the reaction the vessel was cooled and the Buchi discharged to reveal a clear greenish solution. The resulting aqueous solution was diluted 100 percent with methanol (i.e. 200 milliliters of MeOH added to the aqueous solution) and was precipitated into 16 liters of acetone. The white polymer precipitated immediately from the acetone and was recovered by filtration, and vacuum dried. The yield of product was 340 grams (85 percent yield) of the poly(diallyl diethylammonium) bromide polymer. 1 H NMR evidenced the complete absence of vinyl protons in the 5 to 6 ppm region indicating that all the vinyl groups had been converted to polymer.

The DDAB monomer can be prepared as follows. The DDAB monomer was prepared in an essentially one step process. To a two liter 3 neck flask equipped with an overhead stirrer, reflux column (exposed to the atmosphere), and a 500 milliliters addition funnel was added 500 milliliters of acetone and 300 grams of diethylamine (4.167 mols). With stirring, 250 grams (2.067 mol) of allyl bromide was slowly added over one hour. After several minutes, the solution became cloudy and white crystals of the byproduct, diethyldihydroammonium bromide were formed. The reaction was somewhat exothermic, as evident by the refluxing of acetone after approximately 25 percent of the allyl bromide was added to the reaction. The brownish solution containing allyldiethyl amine was filtered to remove the byproduct diethyldihydroammonium bromide, and returned to a clean 3 neck 2 liter flask. With stirring 250 grams more grams of the allylbromide was then added slowly over a one hour period. (The reaction should be stirred for an additional 1 to 2 hours after addition to ensure the reaction has gone to completion). Crystals of the product, diallyldiethylammonium bromide, precipitated out immediately. The product was recovered by filtration and washed with several quantities of acetone (3×100 milliliters) until the brownish color was removed, and dried under vacuum. Theoretical yield, based on the total moles of allylbromide added (4.134 m) was 486 grams, actual yield was 242 grams (50 percent DF232). Analysis by 1 H NMR showed no traces of the byproduct diethyldihydroammonium bromide. (This product is very hydroscopic and will absorb water readily) m.p. of product Literature: 115° C., Actual: 115° C. CAS # for diallyldiethylammonium bromide is 14764-65-9.

The reaction and product can be represented by the following

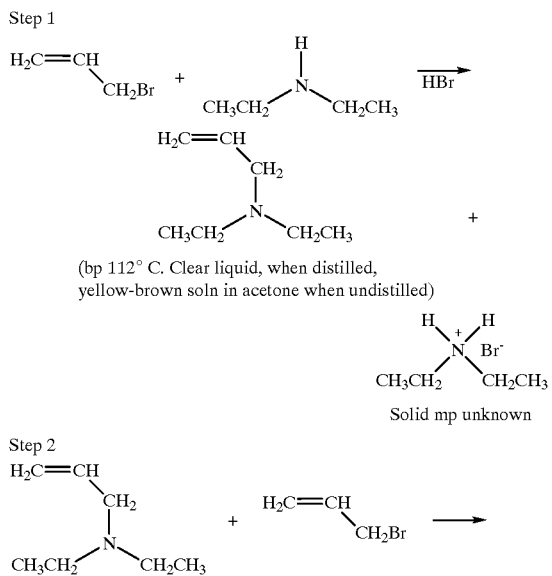

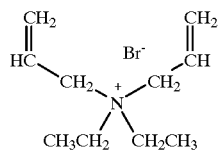

45-50% Yield of White Crystals

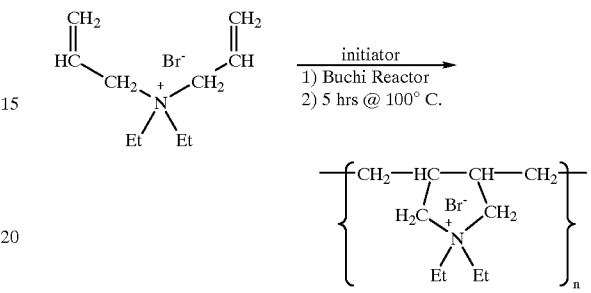

The ink vehicle is preferably water, preferably present in an amount of from about 80 to about 99 weight percent, and more preferably present in an amount of from about 95 to about 99.5 weight percent. Various types of water, such as distilled water, tap water, deionized water, and the like can be selected for the inks. Optionally the inks may contain solvents such as sulfolane, ethylene glycol, urea, diethylene glycol, formamide, dimethylformamide, and the like, in amounts of from about 0 percent to about 50 percent, and preferably from about 5 percent to about 20 percent by weight. Moreover, the inks may contain salts, such as halide salts of lithium, sodium, potassium, or divalent salts, in amounts of from about 0 percent to about 20 percent, and preferably from about 0.5 percent to about 5 percent. Additionally, the inks may contain a buffer, such as tris (hydroxymethyl)amino methane, available from Aldrich, in amounts of from about 0 percent to about 10 percent, and preferably from about 0.5 percent to about 3 percent. Moreover, the ink may contain a penetrant, for example, butyl carbitol, available from Aldrich, in amounts of from about 0 percent to about 5 percent, and preferably from about 0.5 percent to about 2 percent. Also, the inks may contain a biocide, for example, DOWICIL 200™, available from Dow Coming Company, in amounts of from about 0.01 percent to about 1 percent, and preferably from about 0.05 percent to about 0.1 percent.

The inks of the present invention possess a number of suitable viscosities such as for example a viscosity of from about 1 centipoise to about 5 centipoise, and more preferably from about 1 to about 2.5 centipoise at room temperature, about 22° C. The inks of the present invention also possess a range of working surface tensions, such as for example, from about 40 dynes/cm to about 60 dynes/cm, and preferably from about 45 to about 55 dynes/cm at room temperature, about 22° C.

Examples of colorants include dyes such as BASF X-34, Projet dyes, and other acid containing dyes, which interact favorably with the polyquaternary amine salt of the present invention. Other dyes, for example direct dyes, such as Projet Cyan 1 (Direct Blue 199), react unfavorably with the polyquaternary amine salt, such that a precipitate is formed immediately upon interaction of the two materials and pigments with a black color, a cyan color, a magenta color, a yellow color, a red color, a brown color, and the like, and color gamuts. The dye may be black, cyan, magenta, yellow, red, blue, green, brown, mixtures thereof, and the like, present in the ink in an effective amount of, for example, from about 1 to about 65, and preferably from about 2 to about 20 percent by weight of the ink, and most preferably in an amount of from about 1 to about 10 weight percent. Preferred dyes are cyan and magenta dyes available from Miliken, such as cyan X17AB, and magenta REACTINT RED, X52.

Examples of suitable black dyes include various carbon blacks, such as REGAL 330®, channel black, furnace black, lamp black, and the like, such as Levanyl Black A-SF (Miles, Bayer) and Sunsperse Carbon Black LHD 9303 (Sun Chemicals). Colored pigments include red, green, blue, brown, magenta, cyan, and yellow particles, and mixtures thereof. Illustrative examples of magenta pigments include 2,9-dimethyl substituted quinacridone and anthraquinone, identified in the Color Index as CI 60710, CI Dispersed Red 15, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthrathrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Normandy Magenta RD-2400 (Paul Uhlich), Sunsperse Quindo Magenta QHD 6040 (Sun Chemicals), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other dyes may also be selected.

Pigments, can also be selected for the inks of the present invention, such as carbon blacks, like REGAL 330® available from Cabot Corporation, cyan, magenta, yellow, red, blue, green and the like pigments, which pigments are known, reference for example U.S. Pat. No. 5,556,727, the disclosure of which is totally incorporated herein by reference. The pigment amount selected is similar to the dye amount indicated herein.

Preferred pigments and dyes are Acid Blue 9, available from Tricon colors as a 10 weight percent solution, present in amount of from about 1.0 percent to about 3.0 percent, and preferably from about 2.0 percent to about 2.5 percent; Projet Magenta 3BOA, available from Zeneca as a 10 weight percent solution, and Acid Red 52, available from Tricon Colors as a 10 percent solution, present such that the total dye concentration is from about 1.0 percent to about 4.0 percent, and preferably from about 2.0 percent to about 3.0 percent, the dyes being present in a ratio whereby there is present from about 20 percent w/w to about 80 percent of the former dye, and preferably from about 40 percent to about 60 percent of the former dye, with the latter dye making up the difference of 100 percent; Projet Yellow OAM, available from Zeneca as an 8.5 percent solution, present in an amount of from about 1.0 percent to about 5.0 percent, and preferably from about 3.5 percent to about 4.5 percent; X-34, available from BASF as a 33 percent w/w solution, Projet Fast Black 2, available from Zeneca as a 4.4 percent solution, present such that the total dye concentration is from about 1.0 percent to about 10.0 percent, and preferably from about 4.0 percent to about 6.0 percent, the dyes being present in a ratio whereby there is present from about 20 percent w/w to about 80 percent of the former dye, and preferably from about 40 percent to about 60 percent of the former dye, with the latter dye making up the difference of 100 percent. The ink may also contain other known ink additives as indicated herein, each present in effective amounts, such as from about 0.01 to about 5 weight percent like fillers, biocides and the like. Optional additives for further improving the jetting characteristics and the storage stability of the inks, and for preventing undesirable interactions of the inks with the printhead either during the jetting process or while the printer is idle for the inks of the present invention as illustrated herein, include humectants, such as ethylene glycol, diethylene glycol, N-methylpyrrolidinone, 2-pyrrolidinone, propylene glycol, hydroxyethers, ethers, amides, sulfoxides, ketones, lactones, esters, alcohols, and the like, present in an amount of from 0 to about 50 percent by weight, and preferably from about 5 to about 40 percent by weight; biocides like DOWICIL™ 75, 150, and 200, benzoate salts, sorbate salts, and the like, present in an effective amount of, for example, from about 0.0001 to about 4 percent by weight, and preferably from about 0.01 to about 2.0 percent by weight, and the ink.

The inks of the present invention are particularly suitable for use in aqueous acoustic ink jet printing processes. In acoustic ink jet printing, an acoustic beam exerts a radiation pressure against features upon which it impinges. Thus, when an acoustic beam impinges on a free surface of the ink of a pool of liquid from beneath, the radiation pressure, which it exerts against the surface of the pool, may reach a sufficiently high level to release individual droplets of liquid from the pool, despite the restraining force of surface tension. Focusing the beam on or near the surface of the pool intensifies the radiation pressure it exerts for a given amount of input power. K. A. Krause, "Focusing Ink Jet Head," *IBM Technical Disclosure Bulletin,* Vol. 16, No. 4, September 1973, pages 1168 to 1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (the liquid/air interface). Furthermore, printing conventionally is performed by independently modulating the excitation of the acoustic radiators in accordance with the input data samples for the image that is to be printed.

This modulation enables the radiation pressure which each of the beams exerts against the free ink surface to render brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. The size of the ejected droplets is determined by the waist diameter of the focused acoustic beam. Acoustic ink printing is attractive since it, for example, does not require nozzles or the small ejection orifices which have caused many of the reliability and pixel placement accuracy problems that conventional drop on demand and continuous stream ink jet printers have suffered. The size of the ejection orifice is an important design parameter of an ink jet since it determines the size of the droplets of ink that the jet ejects. As a result, the size of the ejection orifice should not be increased without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided so acoustic printing can be performed with a greater variety of inks than conventional ink jet printing, including inks having lower viscosities and inks containing pigments and other particulate components. Acoustic ink printers embodying printheads comprising acoustically illuminated spherical focusing lenses can print precisely positioned pixels (i.e., picture elements) at resolutions which are sufficient for high quality printing of relatively complex images. Also, the size of the individual pixels printed by such a printer can be varied over a significant range during operation, thereby accommodating, for example, the printing of variably shaded images. Furthermore, the known droplet ejector technology can be adapted to a variety of printhead configurations including (1) single ejector embodiments for raster scan printing, (2) matrix configured ejector arrays for matrix printing, and (3) several different types of pagewidth ejector arrays ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference.

Specific embodiments of the invention will now be described in further detail. These Examples are intended to be illustrative, and the invention is not limited to the materials, conditions, or process parameters set forth in these embodiments. All parts and percentages are by weight unless otherwise indicated. In these Examples, the colorant is bound to the vehicle.

EXAMPLE I

Cyan Ink

In a plastic bottle (HDPE) was added water (49.95 grams), sulfolane, (10.0 grams), 2,2'-thiodiethanol (8.0 grams), poly(diethyldiallyl) ammonium bromide (4.0 grams), potassium iodide (2.0 grams), and trizma premixed crystals (1.5 grams), comprised of a mixture of tris (hydroxymethyl)aminomethane (66.36 w/w percent), and tris(hydroxymethyl)aminomethane hydrochloride (33.64 w/w percent), which mixture buffers the pH of the ink to a pH of approximately 8.5 pH units, butyl carbitol (0.5 gram), and DOWICIL 200™ (0.05 gram). The aforementioned components were then stirred for approximately 1 hour using a magnetic stirrer at a speed of about 250 rpm, and at room temperature, about 22° C. To the resulting mixture was added a dye solution of Acid Blue 9 (24.0 grams), available as a 10 w/w percent solution from Zeneca Specialties Inc. and the resulting solution was stirred a further hour under the above same conditions. The ink resulting was then filtered using a cartridge filter apparatus (1 micron glass fiber filter), and the physical properties of the ink were measured. The ink was then printed using an HP1600C printer, and its print quality characteristics were measured. Prints were generated and measured on Color Xpressions paper, available from Xerox Corporation. A solid area print density greater than about 1.4, for example about 1.7, optical density units was measured using a Spectrolino densitometer, available from Gretag Macbeth. Waterfastness of the ink was greater than 85 percent, and was measured as the ratio of optical densities before and after a 5 minute soak in tap water maintained at room temperature, about 22° C. Curl was found to be 16 millimeters, measured as the average elevation of the four comers of a print made at 100 percent area coverage with a 1 centimeter unprinted border, on a standard 8.5"×11" sheet of paper.

After a period of 24 hours at room temperature, about 22° C., no visible precipitate formed. The ink was found to possess a viscosity of 1.98 cPs at 25° C., as measured using a Brookfield Model DV-E viscometer with a Haake Model K20 circulating bath used to control the ink temperature during the measurement, a surface tension of 50.3 dynes/cm, at room temperature, approximately 22° C., as measured using a Kruss Model K10 Surface Tensiometer, and a pH of 8.58, as measured at room temperature, about 22° C., using an Omega Model PHB 357 pH meter.

COMPARATIVE EXAMPLE 1

An ink was prepared in the same manner as above, using all of the same reagents in the same amounts, with the exception that poly(diethyldiallyl) ammonium chloride was selected in place of the poly(diethyldiallyl) ammonium bromide. This ink evidenced a considerable amount of precipitate upon addition of the dye, a film, 1 to 2 millimeters in thickness, containing visible particles, for example, greater than 10 microns by estimation, was found to coat the inner walls of the ink container. It is believed that significant amounts of the component used to formulate the ink were contained in this precipitate, thereby rendering it ineffective for ink jet applications such as aqueous Acoustic Ink Printing. The ink's physical properties and print quality were, therefore, not measured.

EXAMPLE II

Magenta Ink:

In a plastic bottle (HDPE) was added water (47.65 grams), sulfolane, (10.0 grams), thiodiethanol (8.0 grams), poly(diethyldiallyl) ammonium bromide (4.0 grams), potassium Iodide (2.5 grams), trizma premixed crystals (1.5 grams), a mixture consisting of tris(hydroxymethyl) aminomethane (66.36 w/w percent), and tris(hydroxymethyl) aminomethane hydrochloride (33.64 w/w percent), which mixture buffers the pH of the ink to a pH of approximately 8.5 pH units butyl carbitol (0.3 gram), and DOWICIL 200™ (0.05 gram). The above reagents were then stirred for approximately 1 hour using a magnetic stirrer at a speed of about 250 rpm, and at room temperature, about 22° C. To this mixture was added the dye solution Projet Magenta 3BOA (13.0 grams), available as a 10 w/w percent solution from Zeneca Specialties Inc. and Acid Red 52 (13.0 grams) available as a 10 w/w percent solution from Tricon Colors Inc., and the resulting solution stirred a further hour under the same conditions. The ink was then filtered using a cartridge filter apparatus (1 micron glass fiber filter), and its physical properties measured. The ink was then printed using an HP1600C printer, and its print quality characteristics measured. Prints were generated and measured on Color Xpressions paper, available from Xerox Corporation. A solid area print density greater than about 1.3 optical density units, for example 1.4, was measured using a Spectrolino densitometer, available from Gretag Macbeth. Waterfastness of the ink was about 85 percent, measured as the ratio of optical densities before and after a 5 minute soak in tap water held at room temperature, about 22° C. Curl was found to be 20 millimeters, measured as the average elevation of the four corners of a print made at 100 percent area coverage with a 1 centimeter unprinted border, on a standard 8.5"×11" sheet of paper.

After a period of 24 hours at room temperature, about 22° C. The ink was found to possess a viscosity of 1.96 cPs, at 25 degrees centigrade, as measured using a Brookfield Model DV-E viscometer with a Haake Model K20 circulating bath used to control the ink temperature during the measurement, a surface tension of 50.2 dynes/cm, as measured using a Kruss Model K10 Surface Tensiometer, and a pH of 8.54, as measured at room temperature, about 22° C., using an Omega Model PHB 357 pH meter.

COMPARATIVE EXAMPLE 2

An ink is prepared in the same manner of Example II above, using all of the same reagents in the same amounts, with the exception that poly(diethyldiallyl) ammonium chloride was selected in place of poly(diethyldiallyl) ammonium bromide. This ink evidenced a considerable about of precipitate upon addition of the dye, as evidenced by a film, 1 to 2 millimeters in thickness, containing visible particles, for example, greater than about 10 microns by estimation coated the inner walls of the ink container. It is believed that significant amounts of material used to formulate the ink were contained in this precipitate, thereby rendering it ineffective for ink jet applications such as aqueous Acoustic Ink Printing, or thermal ink jet. The ink's physical properties and print quality were, therefore, not measured

EXAMPLE III

Yellow Ink:

In a plastic bottle (HDPE) was added water (35.7 grams), sulfolane (5.0 grams), thiodiethanol (8.0 grams), poly (diethyldiallyl) ammonium bromide (4.0 grams), trizma premixed crystals (1.5 grams) of the above Example I, butyl carbitol (0.75 gram), and DOWICIL 200™ (0.05 grams). The above reagents were then stirred for approximately 1 hour using a magnetic stirrer at a speed of about 250 rpm, and at room temperature, about 22° C. To this mixture was added the dye solution Projet Yellow OAM (45.0 grams), available as an 8.5 w/w percent solution from Zeneca Specialties Inc. and the resulting solution was stirred a further hour under the above same conditions. The ink was then filtered using a cartridge filter apparatus (1 micron glass fiber filter), and its physical properties measured. The ink was then printed using an HP1600C printer, and its print quality characteristics were measured. Prints were generated and measured on Color Xpressions paper, available from Xerox Corporation. A solid area print density greater than 1.1 optical density units, such as 1.3, was measured using a Spectrolino densitometer, available from Gretag Macbeth. Waterfastness of the ink was 80 percent, and was measured as the ratio of optical densities before and after a 5 minute soak in tap water held at room temperature, about 22° C. Curl was found to be 16 millimeters, measured as the average elevation of the four corners of a print made at 100 percent area coverage with a 1 centimeter unprinted border, on a standard 8.5"×11" sheet of paper.

After a period of 24 hours at room temperature, about 22° C., the ink was found to have no visible precipitate formed. The ink was found to possess a viscosity of 1.97 cPs, at 25° C., as measured using a Brookfield Model DV-E viscometer with a Haake Model K20 circulating bath used to control the ink temperature during the measurement a surface tension of 49.9 dynes/cm, as measured using a Kruss Model K10 Surface Tensiometer, and a pH of 8.56, as measured at room temperature, about 22° C., using an Omega Model PHB 357 pH meter.

COMPARATIVE EXAMPLE 3

An ink was prepared in the same manner as above, using all of the same reagents in the same amounts, with the exception that poly(diethyldiallyl) ammonium chloride was selected in place of poly(diethyldiallyl) ammonium bromide. This ink evidenced a considerable amount of precipitate upon addition of the dye, that is there was formed a film, 1 to 2 millimeters in thickness, containing visible particles, for example, greater than 10 microns by estimation coating the inner walls of the ink container. It is believed that significant amounts of material used to formulate the ink were contained in this precipitate, thereby rendering it ineffective for ink jet applications. The ink's physical properties and print quality were, therefore, not measured.

EXAMPLE IV

Black Ink:

In a plastic bottle (HDPE) was added water (39.23 grams), sulfolane, (20.0 grams), poly(diethyldiallyl) ammonium bromide (4.0 grams), potassium Iodide (2.0 grams), trizma premixed crystals (2.0 grams) of the above Example III, butyl carbitol (0.25 gram), and DOWICIL 200™ (0.05 gram). The above reagents were then stirred for approximately 1 hour using a magnetic stirrer at a speed of about 250 rpm, and at room temperature, about 22° C. To this mixture was added the dye solutions, BASF X-34, available as a 33.2 percent (w/w) solution from BASF (10.57 grams), and Projet Fast Black 2, available from Zeneca as a 4.4 percent solution (21.9 grams), and the resulting solution was stirred a further hour under the above same conditions. The ink was then filtered using a cartridge filter apparatus (1 micron glass fiber filter), and its physical properties measured. The ink was then printed using an HP1600C printer, and its print quality characteristics measured. Prints were generated and measured on Color Xpressions paper, available from Xerox Corporation. A solid area print density greater than 1.4 optical density units, for example about 1.6, was measured using a Spectrolino densitometer, available from Gretag Macbeth. Waterfastness of the ink was 87 percent, and was measured as the ratio of optical densities before and after a 5 minute soak in tap water held at room temperature, about 22° C. Curl was found to be 53 millimeters, measured as the average elevation of the four corners of a print made at 100 percent area coverage with a 1 centimeter unprinted border, on a standard 8.5"×11" sheet of paper.

After a period of 24 hours at room temperature, about 22° C., no visible precipitate formed, and its physical properties were measured. The ink was found to have a viscosity of 2.09 cPs, at 25° C., as measured using a Brookfield Model DV-E viscometer with a Haake Model K20 circulating bath used to control the ink temperature during the measurement a surface tension of 51.5 dynes/cm, as measured using a Kruss Model K10 Surface Tensiometer, and a pH of 8.18, as measured at room temperature, about 22° C., using an Omega Model PHB 357 pH meter.

COMPARATIVE EXAMPLE 4

An ink is prepared in the same manner as above, using all of the same reagents in the same amounts, with the exception that poly(diethyldiallyl) ammonium chloride was selected in place of poly(diethyldiallyl) ammonium bromide. This ink evidenced considerable amount of precipitate upon addition of the dye thereby forming a thin film, 1 to 2 millimeters in thickness, containing visible particles, for example, greater than about 10, and more specifically, from about 11 to about 14 microns by estimation coated the inner walls of the ink container. It is believed that significant amounts of material used to formulate the ink were contained in this precipitate, thereby rendering it ineffective for ink jet applications such as Acoustic Ink Printing. The ink's physical properties and print quality were, therefore, not measured.

Other modifications of the present invention may occur to those skilled in the art subsequent to a review of the present application, and these modifications, including equivalents thereof, are intended to be included within the scope of the present invention.

What is claimed is:

1. An ink composition comprised of a colorant and poly(diallyl diethyl ammonium) bromide.

2. An ink in accordance with claim 1 wherein the ink is an aqueous ink.

3. An ink in accordance with claim 1 wherein the ink contains water.

4. An ink in accordance with claim 3 wherein said water is present in an amount of about 60 to about 99.5 weight percent.

5. An ink in accordance with claim 3 wherein said water is present in an amount of about 80 to about 99 weight percent.

6. An ink in accordance with claim 1 wherein the $M_w$ of said poly(diallyl diethyl ammonium) bromide is from about 500 to about 3,000.

7. An ink in accordance with claim 1 wherein the Mw of said polly(diallyl diethyl ammonium) bromide is from about 1,000 to about 2,000.

8. An ink in accordance with claim 1 wherein said poly(diallyl diethyl ammonium) bromide is present in an amount of from about 0.5 to about 10 weight percent, and wherein the total of all ink components is about 100 weight percent.

9. An ink in accordance with claim 1 wherein said poly(diallyl diethyl ammonium) bromide is present in an amount of from about 1 to about 4 weight percent, and wherein the total of all ink components is about 100 weight percent.

10. An ink in accordance with claim 1 wherein the colorant is a dye.

11. An ink in accordance with claim 1 wherein the colorant is black.

12. An ink in accordance with claim 1 wherein the colorant is magenta, yellow, cyan, red, blue, green, black, or mixtures thereof.

13. An ink composition in accordance with claim 2 wherein the colorant is a dye present in said ink in an amount of from about 0.01 to about 10 percent by weight.

14. An ink composition in accordance with claim 1 wherein said colorant is a dye present in an amount of from about 1 to about 10 weight percent, and wherein said colorant is cyan, magenta, yellow, blue, green, brown, black, or mixtures thereof.

15. An ink in accordance with claim 1 containing a solvent.

16. An ink in accordance with claim 15 wherein the solvent is sulfolane, 2,2'-thiodiethanol, or butyl carbitol present in an amount of from about 1 to about 40 percent by weight.

17. An ink in accordance with claim 15 wherein the solvent is present in an amount of from about 10 to about 20 percent by weight or parts.

18. An ink in accordance with claim 1 containing a biocide.

19. An ink in accordance with claim 18 wherein the biocide is present in an amount of from about 0.01 to about 0.25 percent by weight.

20. A printing process which comprises incorporating into an ink jet printer an ink composition comprised of a colorant and poly(diallyl diethyl ammonium) bromide, and causing droplets of the ink to be ejected in imagewise pattern onto a substrate.

21. A process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being directed to focus with a finite waist diameter in a focal plane, said ink comprising the components of claim 1; and (b) causing droplets of said ink to be ejected onto a recording sheet in an imagewise pattern at an optional temperature of from about 25° C. to about 50° C.

22. A thermal ink jet process wherein images are developed with the ink of claim 1.

23. An imaging process wherein there are developed images with an aqueous ink comprised of a colorant, a vehicle and poly(diallyl diethyl ammonium) bromide.

24. An imaging process in accordance with claim 23 wherein said vehicle is water.

* * * * *